United States Patent [19]

van Geel et al.

[11] 4,425,148

[45] Jan. 10, 1984

[54] DEVICE FOR THE CONTINUOUS PRODUCTION OF GLASS BODIES ESPECIALLY CONTAINING RADIOACTIVE WASTE

[75] Inventors: Jacobus N. C. van Geel, Retie; Frans M. Dobbels, Dessel; Walther A. H. Theunissen, Hamont, all of Belgium

[73] Assignee: Deutsche Gesellschaft fur Wiederaufarbeitung, Fed. Rep. of Germany

[21] Appl. No.: 352,036

[22] Filed: Feb. 24, 1982

[30] Foreign Application Priority Data

Mar. 7, 1981 [DE] Fed. Rep. of Germany ....... 3108694

[51] Int. Cl.³ .............................................. C03B 19/10
[52] U.S. Cl. ..................................... 65/142; 65/21.5; 65/35; 65/75; 65/209; 264/15; 425/6; 425/333
[58] Field of Search ................. 264/9, 13, 15; 425/6, 425/333; 65/21.5, 142, 35, 72, 75, 209

[56] References Cited

U.S. PATENT DOCUMENTS

| | | | |
|---|---|---|---|
| 666,422 | 1/1901 | Humphrey | 65/209 |
| 1,482,760 | 2/1924 | Milliken | 65/72 X |
| 1,845,491 | 2/1932 | Eckert | 65/209 |
| 2,661,575 | 12/1953 | Kennedy | 425/6 X |
| 2,793,282 | 5/1957 | Steigerwald | 425/6 X |
| 3,254,979 | 6/1966 | Knapp et al. | 65/21.5 |
| 3,352,658 | 11/1967 | Knapp | 65/75 X |
| 3,499,745 | 3/1970 | Plumat | 264/15 X |
| 3,797,978 | 3/1974 | Young et al. | 65/15 X |
| 3,869,232 | 3/1975 | Ruus et al. | 425/6 |

*Primary Examiner*—Robert L. Lindsay, Jr.
*Attorney, Agent, or Firm*—Allegretti, Newitt, Witcoff & McAndrews

[57] ABSTRACT

An apparatus for converting molten glass containing radioactive waste into molded pellets or spheres comprising means for generating a flowing stream of the molten glass and a rotating wheel disposed beneath the flowing stream. The wheel is preferably mounted for rotation about a horizontal axis and has a series of mold cavities formed in the circumferential wall of the wheel, into which cavities the stream is directed by gravity. The mold cavities have flared side walls so that when the stream strikes the inclined wall it is deflected toward the center of the cavity through a focal point. The side walls of adjacent mold cavities form a knife edge at the surface of the wheel to preclude the bridging of glass from one cavity to another.

15 Claims, 11 Drawing Figures

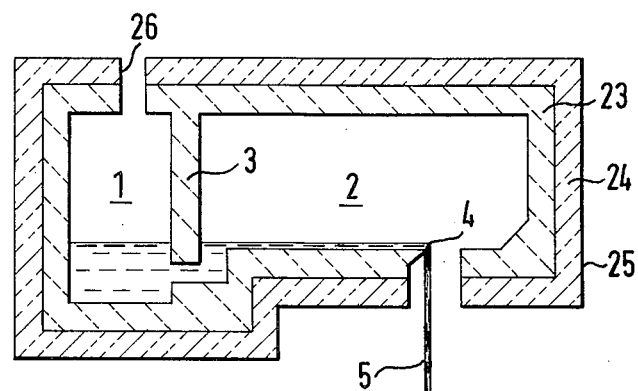
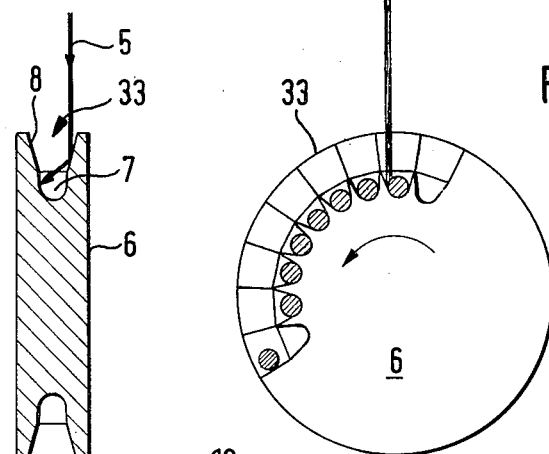
FIG. 1
FIG. 2
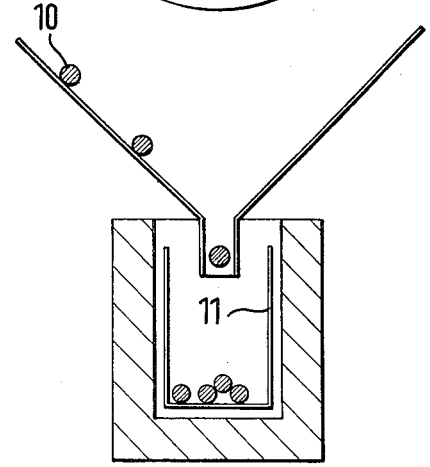

DEVICE FOR THE CONTINUOUS PRODUCTION OF GLASS BODIES ESPECIALLY CONTAINING RADIOACTIVE WASTE

The present invention relates to a device for the continuous molding, with precision and safety, of glass bodies, especially those containing radioactive waste.

Such devices serve to treat melts, especially highly radioactive glass melts, for solidification and vitrification of the radioactive materials therein.

Because of the dangers connected with handling radioactive material high demands are made on solidification processes and vitrification processes of liquid highly radioactive material. Each apparatus for handling such melt must have as few mechanical elements as possible which entail the danger of inaccurate working and susceptibility to trouble. Moreover, it is necessary to operate and service such devices by remote control inside a cell, while meeting high demands regarding precision and safety. Also, such devices must be designed in such a way that in case of trouble an immediate interruption cut-off of the flow of the melt takes place.

The vitrification devices and vitrification procedures for the solidification of liquid highly radioactive waste developed up to now do not provide, as a rule, a continuous flow of the melt but work discontinuously, with few exceptions, by giving off 30 to 50 liter portions of melt per work cycle.

Great Britain Pat. No. 1,446,016 discloses a method where the flow-off of the melt is fed into an intermediate vessel and from there through a number of nozzles to produce vitrified beads. In order to achieve a sufficient capacity, relatively many nozzles are required and that increases expenditures for technical accessories. A further disadvantage consists in the fact that only bead sizes of maximally 1 g per bead can be produced. For the production of spheres by means of a casting mold the apparatus requires a roller belt having large dimensions and a vibration device, both of which could be susceptible to trouble. Moreover, the control of the melt is not satisfactory and the safety needs improving.

The object of the present invention is to obviate the disadvantages described above, with minimum constructural expenditure, improved continuous production of the glass bodies, improved conditioning of radioactive waste materials, as well as a better control of the flow of the melt.

In accordance with the invention molten glass containing radioactive material flows continuously from a glass-melt furnace in a single stream. The melt is deposited in a series of mold cavities disposed in a rotating wheel or drum beneath the furnace. The glass melt solidifies in the mold to form glass pellets or spheres which are continuously discharged from their cavities before they once again rotate to filling position. The discharged pellets are collected in a container disposed beneath the rotating wheel for disposition.

The device of the invention avoids the disadvantages of the techniques known to date and offers advantages with respect to safe handling and quantitative control of the flow of the molten material for the production of the glass spheres. It also makes possible continuous production of the glass bodies at a high production speed. By changing the feeding speed of the melt flow and correspondingly the speed of rotation and/or of the diameter of the wheel, the production speed is variable over a wide range. By a change of the diameter of the casting cavities in the wheel and also by a change of the speed of rotation of the wheel, the size of the glass spheres is adjustable.

Other advantages will become apparent from the detailed description which follows.

The delivery device or furnace which supplies the molten glass contains a pressure chamber with an overflow to permit controlling by pressure the rate of flow of the glass melt, whereby the production of qualitatively high-grade and homogeneous glass bodies is guaranteed. The delivery device also includes means for interrupting the flow immediately in case of trouble.

By mounting the cavity-containing wheel horizontally so that it rotates about a vertical axis the cooling time for the pellets or spheres can be extended up to four times the cooling time provided with a vertically-arranged wheel. With a vertical arrangement of the wheel, the molded glass pellets drop out automatically at one-fourth revolution whereas with a horizontally-arranged wheel the pellets may remain in the cavities for a full revolution, and then removed.

According to another feature of the invention, the mold cavities are flared toward the top and the wall between adjacent cavities is sharp at the top which prevents the glass from bridging between the cavities and the molded parts therein. Besides a deflection of the melt stream hitting the flared wall of the casting bore, a sudden change of the angle of deflection is brought about whereby the melt stream experiences an acceleration, which leads to a short-time interruption of the continuously flowing melt stream so that the bridge formation cannot occur. The sharper the formation of the separating wall between the casting bores, the better the bridge formation is prevented.

To assure solidification of the glass bodies with minimum cooling when they drop out of the casting cavities the glass spheres can be cooled in a controlled manner outside the mold cavities.

The present invention is suited in an excellent way for bonding liquid and/or solid radioactive waste. But the present invention also is suited for producing pure glass beads or glass bodies or to bond in other materials (for instance, for the production of jewelry) or other waste materials, for instance, toxic materials.

The invention will now be explained in detail by means of the accompanying drawings in which various embodiments of the invention are illustrated.

FIG. 1 is a cross section through a glass delivery furnace and a molding wheel in accordance with a first embodiment of the invention.

FIG. 2 is a vertical (axial) cross section through the wheel shown in FIG. 1.

Figures 3, 4:
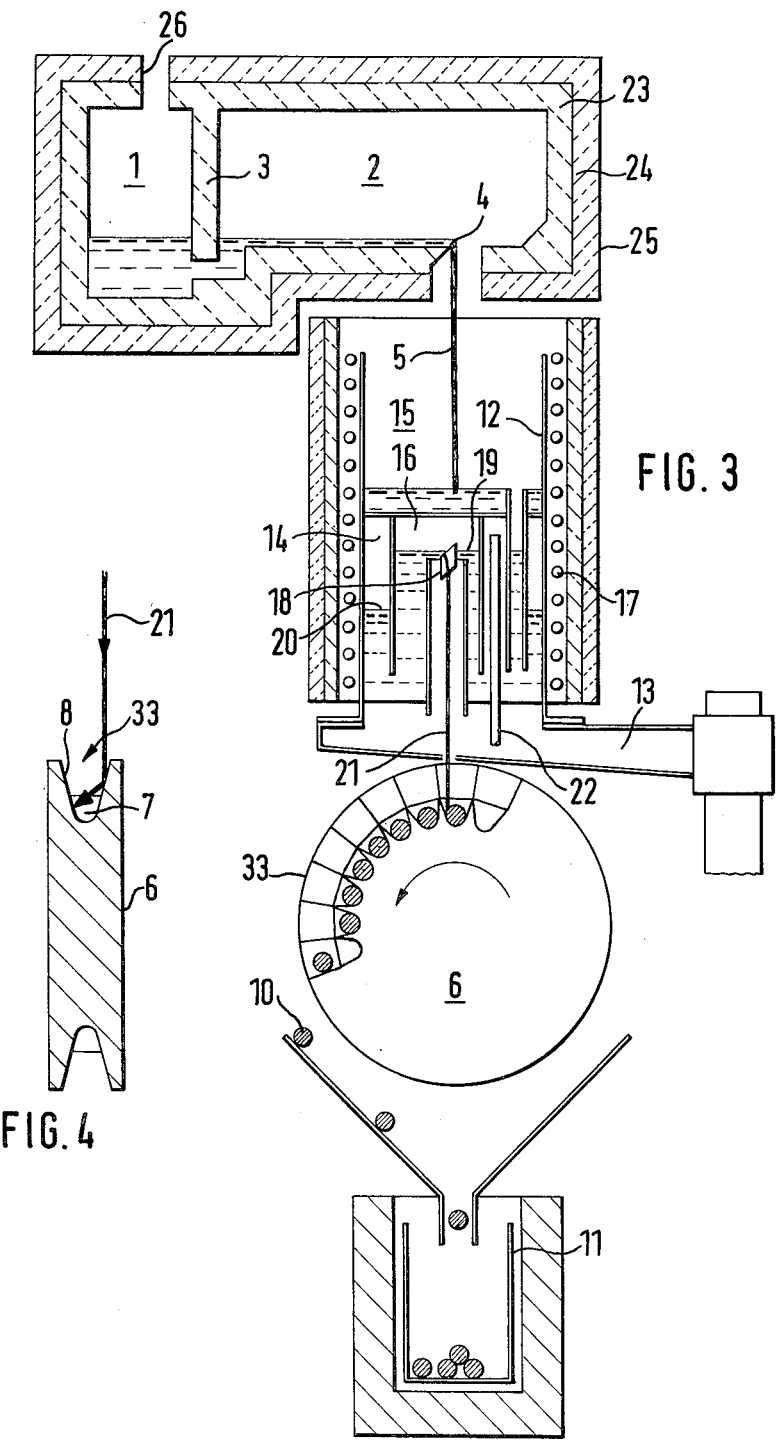
FIG. 3 is a cross section of a second embodiment of the device as defined in the invention having means for stabilizing the quantity of melt dispensed to the wheel.
FIG. 4 is an axial cross section through the wheel of the device shown in FIG. 3.

The melting and dispensing furnace according to FIGS. 1 to 10 has a melting chamber 1 and a refining chamber 2, both of which consist of refractory material 23, an insulating jacket 24 and a steel jacket 25. An inlet 26 permits the continuous feeding of radioactive liquid or solid materials and of a weighed or metered stream of glass-forming additives into a furnace. It has an outlet (not illustrated) for waste gases. The melting chamber 1 can be heated by an electric resistor or by a Joule heating device (not illustrated) and is separated from the refining chamber 2 by a ceramic separating wall 3. The wall prevents the flow of crusts on the glass surface from the melting chamber 1 into the refining chamber 2. The glass melt, which is formed in the melting chamber 1, streams into the refining chamber 2 having a refractory overflow trough 4.

Figures 5, 6:
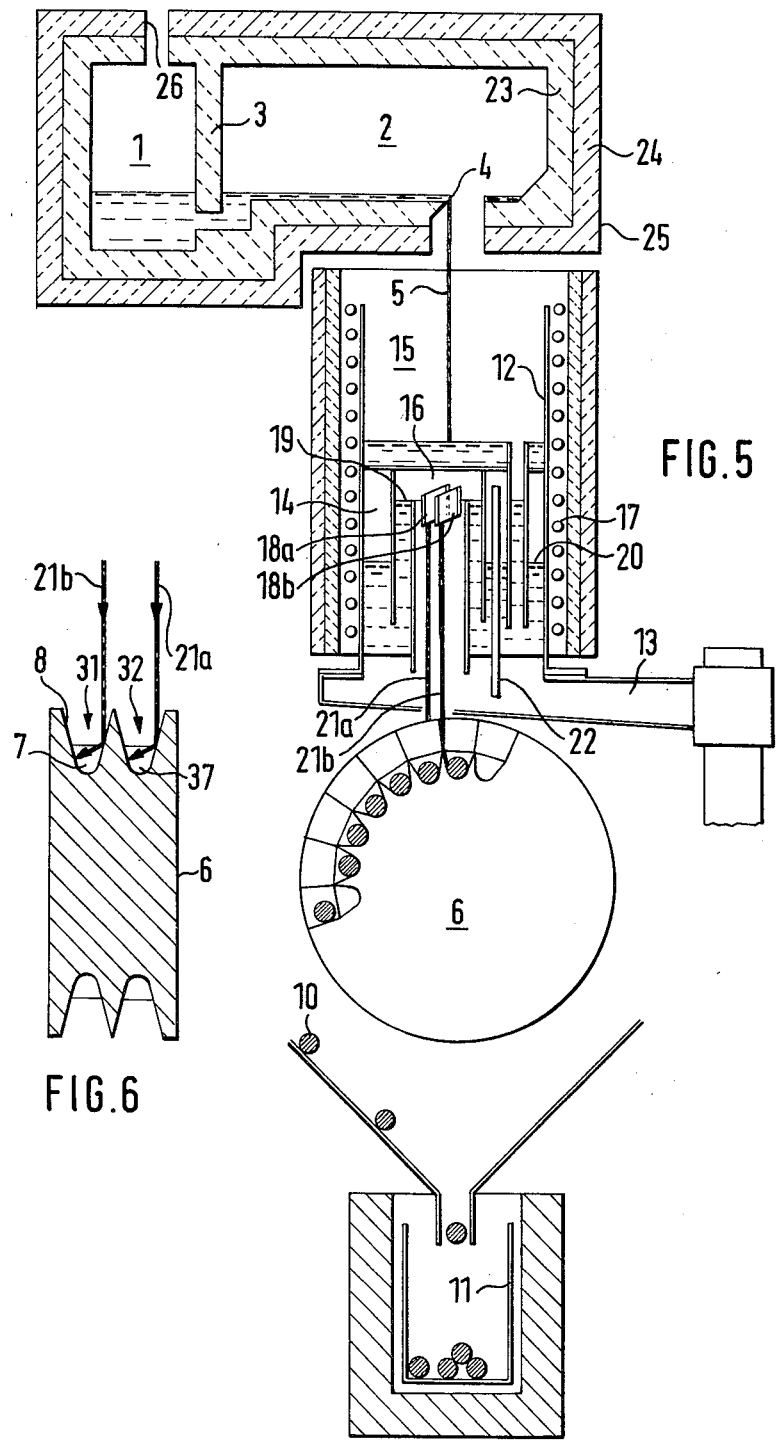
FIG. 5 is a cross section of a third embodiment of the device as defined in FIG. 2, including means for high throughputs of glass melt to a wheel with two rows of mold cavities.
FIG. 6 is an axial cross section through the wheel of the device shown in FIG. 5.
Figure 8:
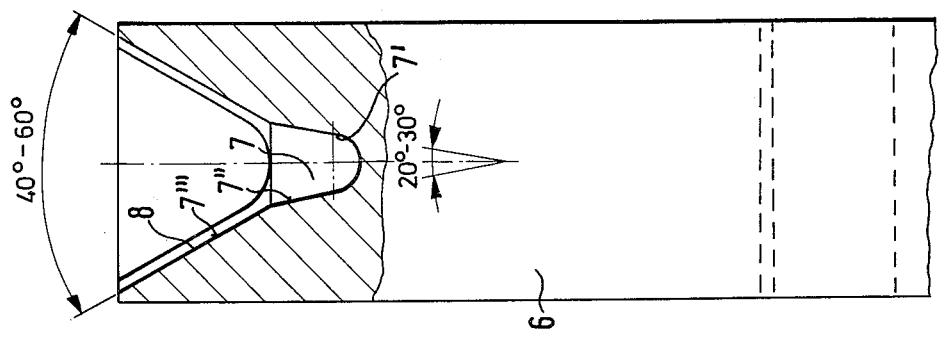
FIG. 8 is an axial cross section through the wheel, like FIG. 4 illustrating the mold cavity in detail.
Figure 10:
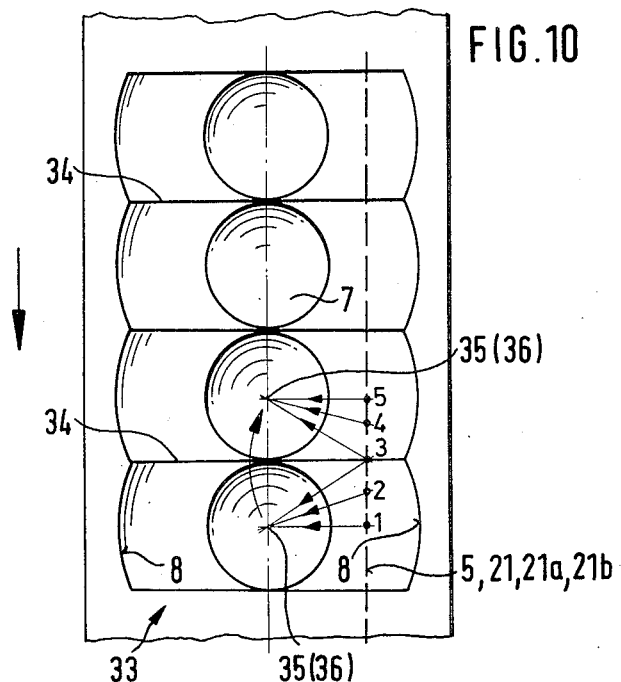
FIGS. 9 and 10 illustrate the flow patterns of the glass melt stream when it hits the mold cavities of the wheel, designed according to any of FIGS. 1 to 8.
Figure 9:
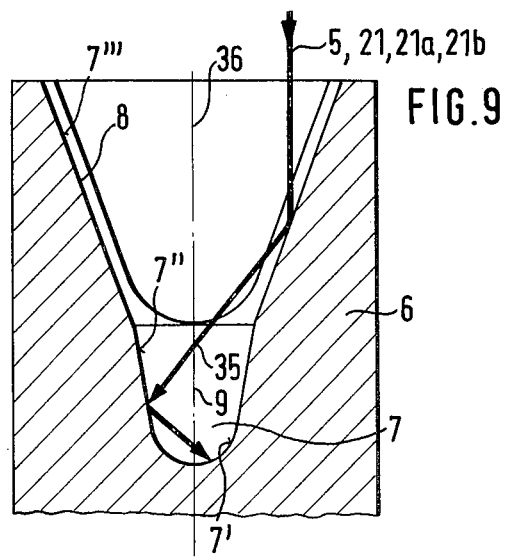

The glass melt 4 flows onto a vertically rotating wheel (circular disk or drum) 6 which has molding cavities 7 whose side walls 8 are flared and curved in such a way that the glass melt 5 is deflected radially toward the focal point 35 in the center of the molding cavity 7, as best shown in FIGS. 9 and 10. The molding cavities or bores 7 are blind-end bores having an approximately funnel-like shape. In the illustrated embodiment the lower part 7' is approximately semi-spherical. The wall of the upper part 7" widens slightly outward toward the periphery of the wheel and then more sharply as indicated at 7''' where the cavity opens into the periphery of the wheel, as shown especially in FIGS. 7 to 10. As indicated in FIG. 8, the conical wall 7" flares at an angle between 20° and 30°. The segmental end walls 8 which join dividing walls 34 flare at an angle of between 40° and 60°. The molding cavities are arranged in a line 33 around the periphery of the wheel. They can also be arranged in multiple parallel tracks, for instance, two tracks 31, 32 as illustrated in FIGS. 5 and 6.

A preferred form of the molding cavity 7 is illustrated in FIGS. 9 and 10. The funnel-shaped widening at 7''' is a segment of a conical bore which has a concave surface. The curvature of surfaces 8, which are aligned in a circumferential direction around the wheel, are selected so that the glass melt stream 5, 21, after striking the surface 8, is deflected through a focal point 35 on the center line 9. The deflection toward a focal point has the advantage of quicker gathering of the parts of the stream into glass drops with the effect that the speed of production is increased.

The lateral walls 8 of adjacent cavities join a separating wall 34 terminating in a knife edge at the peripheral surface of the wheel 6 so that the deflected glass melt stream abruptly changes its direction when passing from one cavity to the other. FIG. 10 shows the directions of the deflected steams for different impact points 1 to 5 during the rotation of the wheel 6. The acceleration of the glass melt flow during the passage from one casting cavity to the next increases with the sharpness of the upper edge of the separating wall 34. By the change of direction and speed of the stream a short time interruption of the stream is effected. Thus, formation of a bridge between the glass masses in adjacent casting cavities is avoided.

Figure 11:
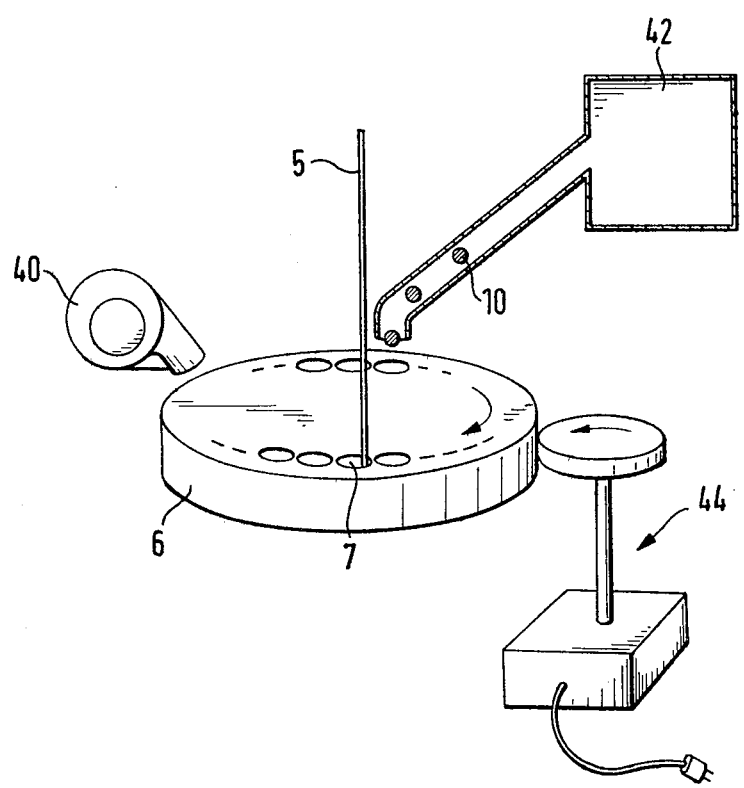
FIG. 11 is a schematic view of a further embodiment of the device as defined in the invention which includes a suction device, a vibrating device and a cooling device.

The melt bodies 10 solidify in the cavities 7 and, as the wheel turns, drop out of the cavities by gravity into a receptacle 11 heated to 500° C., or the freezing point of the selected glass. The discharge rate of the glass melt from trough 4 together with the corresponding adjusted rotary speed of the wheel 6 determine the weight quantity of glass per product unit. The wheel is cooled with air by blower 40, FIG. 11, to the extent that the temperature of the solidifed glass body, when it drops out, is somewhat below the upper solidification point of the selected glass.

Between the wheel 6 and the receptacle 11 a distributing device (not illustrated) may be provided which makes possible the changing of receptacles without interrupting the continuous production of glass bodies. The distributing device may consist of an inlet and several outlets which can be used as desired. In the device illustrated in FIG. 3, the glass melt flows from the furnace into a delivery or discharge device 15 which has an overflow vessel 12. The delivery device 15 is supported by a lifting device 13. It has a pressure chamber 14 which connects with an overflow chamber 16. The pressure chamber 14 is ring-shaped, arranged around an outlet or an outlet nozzle 18. A pneumatic pressure line 22 connects to the pressure chamber 14 to put it under slight pressure during the delivery operation.

The melt in the delivery device 15 is kept at the desired viscosity by means of an electric heating device 17. The melting flowing from the overflow 4 into the delivery device 15 finally leaves the delivery device by way of the outlet nozzle 18 which is arranged at the level of the overflow level of the delivery device 15. In dependence on the level 19 of the melt in the overflow chamber 16—with the level 19 being controlled by the melt level 20 in the pressure chamber 14—the melt is delivered by way of the outlet nozzle 18 either dropwise (delivered quantities of 1 liter melt per hour and per nozzle) or as a continuous stream (with higher production rates).

If very quick interruption of the delivery process becomes necessary, the excess pressure in the chamber 14 is removed and the flow to the melt vessel is immediately interrupted because the level 19 of the melt in the overflow chamber 16 drops below the nozzle outlet. The continuous flow from the overflow 4 into the delivery device 15 is accommodated in the delivery vessel by the regulation of the level 20 of the melt in the chamber 14.

In the device illustrated in FIG. 5, the delivery device has two nozzles 18a, 18b. The glass melt 5 is thereby divided into two glass streams 21a and 21b. Both glass streams fall onto the rotating wheel 6 which has casting cavities in two tracks as shown in FIG. 6. The dividing of the glass melt into several small streams makes possible the reduction of the diameter of the wheel in comparison to a one-track wheel having the same throughput. Also the device according to FIG. 5 makes possible—like the device according to FIG. 3—an immediate interruption of the delivery operation.

Figure 7:
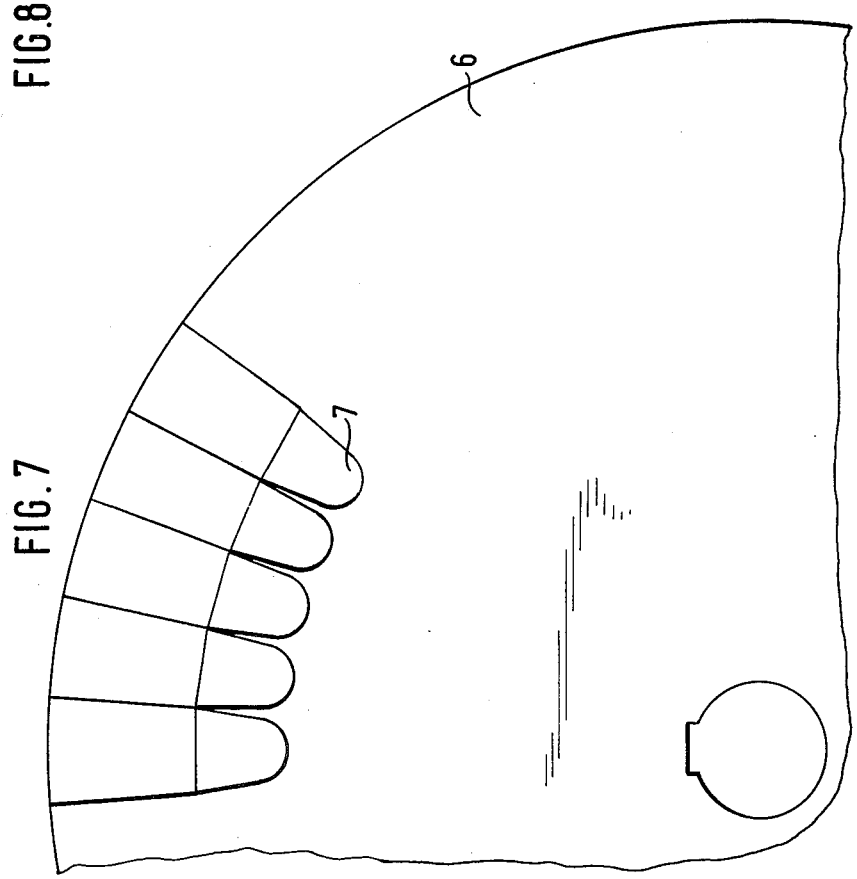
FIG. 7 is a cross section in the radial direction through a wheel for use with the device of FIGS. 1 to 3.

FIG. 7 shows a cross section in the radial direction through a wheel 6 with casting bores or cavities 7 arranged in one track. FIG. 8 shows a cross section in the axial direction through the wheel of FIG. 4. The cavities 7 have a diameter that corresponds to the desired dimension of the glass bodies. The distance of the focal points of the bores 7 from each other determines, together with the diameter of the wheel and with that of the cavity, the maximal depth of the cavity and thereby the degree of filling.

FIGS. 1 to 10 illustrate the wheel or the circular disk 6 in a vertical position, i.e. rotating around a horizontal axis, and is described with respect to this arrangement. However, the wheel can also be arranged horizontally to rotate around a vertical axis, see FIG. 11. In this case the molding cavities 7 are formed in the lateral, upward pointing surface of the wheel, preferably in form of a circular track or of several circular tracks arranged concentrical to one another. The cavities proper are made just like those in the vertically-disposed wheel. In order to remove the glass bodies formed in the cavities a suction device 42 is provided which can be effectively operated with a fraction of a full rotation or only with a full rotation of the wheel.

According to another form of the invention, the wheel can be in operative connection with a vibrating device 44 by means of which a bridge formation between the glass bodies in the cavities can be prevented. Under certain circumstances it is then not necessary to select the special design of the molding cavities described above. But this vibration system may also be employed in combination with the specially designed molding cavities as described above to insure the prevention of a bridge formation.

We claim:

1. Device for continuous production of molded glass bodies from a glass melt containing radioactive waste comprising means for dispensing said melt in a continuous stream, and a wheel mounted for rotation beneath said dispensing means, said wheel having formed in a surface thereof a series of mold cavities for receiving said melt as the wheel rotates, adjacent cavities being circumferentially separated by thin flat walls terminating in a knife edge, said thin flat walls of each cavity being joined at their ends by frusto-conical segmental walls.

2. The device of claim 1 in which said dispensing means includes pressure means for regulating the flow of said melt.

3. The device of claim 1 in which said mold cavities are disposed in the periphery of said wheel, and said wheel rotates about a horizontal axis.

4. The device of claim 3 in which said wheel is in the shape of a drum and contains a multiplicity of aligned mold cavities located on a circumferential line on said periphery.

5. The device of claim 1 in which said mold cavities are disposed in one face of said wheel and said wheel rotates about a vertical axis.

6. The device of claim 4 in which said mold cavities are arranged in a plurality of parallel rows.

7. The device of claim 5 in which said mold cavities are arranged in a circle.

8. The device of claim 1 which includes means for removing said molded bodies from the cavities by means of air pressure.

9. The device of claim 1 in which said wheel is offset from said dispensing means so that the center line of said stream is not aligned with the center line of said mold cavities.

10. The device of claim 1 in which the portion of said cavity wall below said thin flat walls and connecting frusto-conical segmental walls is spherical in shape.

11. The device of claim 9 in which the slope and curve of each said frusto-conical segmental wall is selected so that when said stream strikes said segmental wall it will be deflected toward the center of said cavity and pass through a focal point.

12. The device of claim 1 in which said dispensing means includes a chamber having a barrier over which said melt flows.

13. The device of claim 12 in which said dispensing means includes means for pressurizing said chamber to control the rate of flow over said barrier.

14. The device of claim 12 which includes a nozzle downstream of said barrier for forming said melt stream.

15. The device of claim 6 in which said dispensing means includes a chamber having a barrier over which said melt flows and a plurality of nozzles, one for each said row, downstream of said barrier, for forming said melt stream.

* * * * *